(12) United States Patent
Weston et al.

(10) Patent No.: US 6,633,143 B2
(45) Date of Patent: Oct. 14, 2003

(54) REACTIONLESS ROTARY DRIVE MECHANISM

(75) Inventors: Nicholas J. Weston, Edinburgh (GB); Kenneth C-H Nai, Edinburgh (GB); Geoff McFarland, Dursley (GB); David R McMurtry, Dursley (GB)

(73) Assignee: Renishaw PLC, Gloucestershire (GB)

( * ) Notice: Subject to any disclaimer, the term of this patent is extended or adjusted under 35 U.S.C. 154(b) by 6 days.

(21) Appl. No.: 09/936,919

(22) PCT Filed: Jan. 31, 2001

(86) PCT No.: PCT/GB01/00370

§ 371 (c)(1),
(2), (4) Date: Sep. 28, 2001

(87) PCT Pub. No.: WO01/57473

PCT Pub. Date: Aug. 9, 2001

(65) Prior Publication Data

US 2002/0162230 A1 Nov. 7, 2002

(51) Int. Cl.$^7$ ................................................. H02P 1/54
(52) U.S. Cl. ................................ 318/34; 318/40; 318/48; 318/611; 318/630; 310/112; 310/114; 310/118; 33/503; 74/89.1; 74/89.34
(58) Field of Search ............................. 318/560, 565, 318/648, 34, 66, 68, 69, 77, 86, 625, 630, 611, 689; 33/503; 74/89.34, 89.42, 89.1; 310/112, 114, 118

(56) References Cited

U.S. PATENT DOCUMENTS

| 4,021,716 A | 5/1977 | Rue | 318/648 |
|---|---|---|---|
| 4,375,047 A | 2/1983 | Nelson et al. | 318/48 |
| 4,407,463 A * | 10/1983 | Ashida | 242/201 |
| 4,976,163 A | 12/1990 | Schumacher | 74/5.47 |
| 5,012,170 A * | 4/1991 | Atlas | 318/611 |
| 5,063,336 A | 11/1991 | Atlas | 318/611 |
| 5,189,806 A | 3/1993 | McMurtry et al. | 33/503 |
| 5,291,112 A * | 3/1994 | Karidis et al. | 318/568.1 |
| 5,704,250 A * | 1/1998 | Black | 74/424.8 B |
| 5,751,078 A * | 5/1998 | Loewenthal | 310/36 |
| 6,158,136 A * | 12/2000 | Gotz et al. | 33/503 |
| 6,460,379 B2 * | 10/2002 | Pawlwnko et al. | 65/484 |

* cited by examiner

Primary Examiner—Bentsu Ro
Assistant Examiner—Rina I. Duda
(74) Attorney, Agent, or Firm—Oliff & Berridge, PLC

(57) ABSTRACT

An articulating probe head includes motors 12 and 18 for driving respective output shafts 14 and 20 about respective orthogonal axes z and x to move a stylus 22 over the surface of a workpiece under the control of a controller 26. At least one of the motors is inertia balanced by mounting the stator 32 of the motor on bearings 42 to allow it to rotate in opposition to the rotation of the rotor 34. Control of the speed of the spinning stator is achieved by connecting it to the winding assembly 46 of an additional "back-to-earth" motor 47 the magnet assembly 48 of which is connected to the housing. The motor 47 acts as a brake to prevent overspeeding of the rotatable stator, and can have power supplied to it to ensure that the stator does not slow down excessively when the main motor is running at constant angular velocity. Control of the power supply to the motors is achieved by the controller 26.

7 Claims, 4 Drawing Sheets

REACTIONLESS ROTARY DRIVE MECHANISM

CROSS-REFERENCE TO RELATED APPLICATIONS

This application is a 371 of PCT/GB01/00370 filed on Jan. 31, 2001.

BACKGROUND OF THE INVENTION

1. Field of the Invention

The invention relates to a mechanism for providing reactionless drive to a rotary member of, for example, an articulating probe head which may be mounted on the movable arm of a coordinate positioning machine.

2. Description of Related Art

In our U.S. Pat. No. 5,189,806 there is described an articulating probe head capable of orienting a probe with two degrees of freedom to enable the probe to be used in an operation for scanning the surfaces of workpieces.

In general, such a probe head includes a rotary drive mechanism having a relatively fixed supporting structure and a rotary member which is rotatable by a motor relative to the supporting structure about an axis of the structure. The motor includes, in the case of an electric motor for example, a stator operably connected to the supporting structure and a rotor operably connected to the rotary member. Torque generated by the motor and applied to the rotary member also causes an equal and opposite reaction torque to be applied to the stator and thus to the supporting structure.

This reaction torque can cause a rotation on the movable arm of the coordinate positioning machine on which the probe head is mounted, leading to errors in the measurements made by the machine.

In the specific example shown in the patent specification referred to, a second rotary drive mechanism is mounted on the output shaft of the first mechanism and rotates a second rotary member about an axis at right angles to the axis of the first rotary mechanism.

Because the articulating probe head described in the above patent specification is required at times to drive a probe mounted on it with an oscillatory motion, in one of the preferred embodiments, the so-called stator is mounted on a bearing to allow it to rotate freely relative to the support structure and the rotor, so that the angular momentum of the rotor is counter-balanced by the freely spinning stator.

Thus, when the motor is operated to accelerate the rotary member, the free spinning stator accelerates in the opposite direction reacting to the output rotor torque. Thus there is no natural path back to the static structure to react the rotor output torque, and thus no resultant torque is passed back to the machine on which the head is mounted.

However, there are occasions when it is necessary to control the speed of the rotatable stator. For example, there are opposing torques applied to the spinning stator which create losses in the angular momentum of the stator and which would tend to slow the stator down in a constant angular velocity rotor move. These losses are due to aerodynamic drag on the rotating stator, friction in various parts of the stator assembly, and a back EMF which is created as the stator coils rotate through the magnetic field of the motor. In order to maintain the relative angular speed of the spinning stator, power has to be supplied in some manner to the stator to overcome these losses.

At the same time, external forces applied to the rotor member, such as for example, gravity torque, or a torque produced by the probing force between the probe and a workpiece, act to slow the rotor down. This causes the control system to supply more power to the motor driving the rotor, to maintain the probing speed, and this additional power tends to then over-speed the freely spinning stator. To overcome this, a mechanism has to be provided which will apply a braking force to the spinning stator.

SUMMARY OF THE INVENTION

These problems are overcome in accordance with the present invention by providing an additional motor including a winding assembly and a magnet assembly, one of which is attached to the rotatable stator, and the other of which is attached to the fixed structure of the housing.

By this means, the additional motor provides a frictionless braking force on the free spinning stator which increases as the speed of rotation of the stator increases. Also when it is necessary to provide power to the stator to overcome losses, this is achieved by supplying current to the additional motor.

The reactionless behaviour in such a configuration is therefore limited to accelerations of the rotary drive mechanism. Reactions due to external probing etc are transmitted to the mountings of the mechanism, reactions due to rotary accelerations are not.

BRIEF DESCRIPTION OF THE DRAWINGS

The invention will now be more particularly described, by way of example only, and with reference to the accompanying drawings in which.

DETAILED DESCRIPTION OF EXEMPLARY EMBODIMENTS

Figure 1:
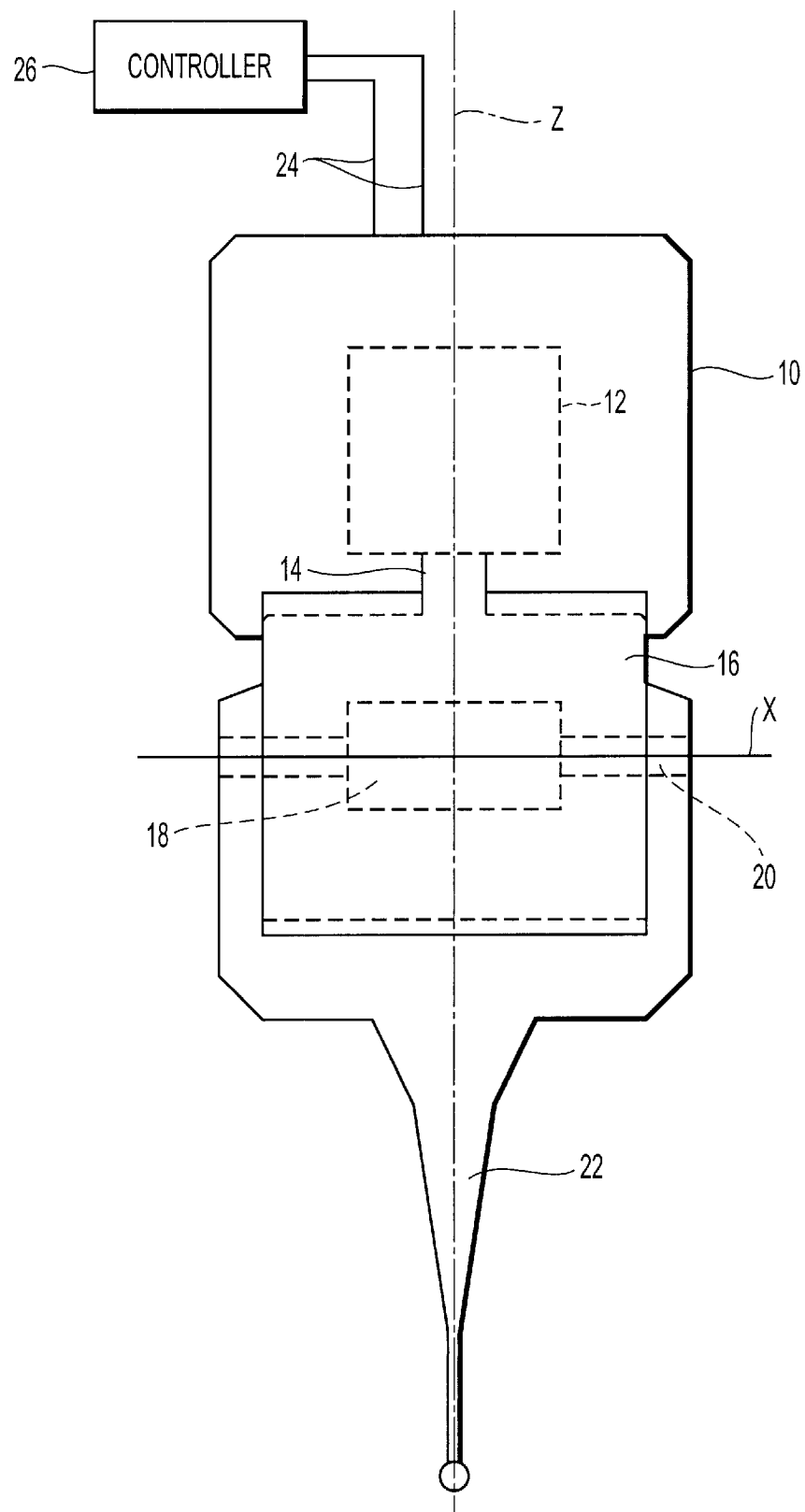
FIG. 1 is a diagrammatic representation of an articulating head which incorporates a reactionless rotary drive mechanism of the present invention.

Referring now to the drawings, in FIG. 1 there is shown an articulating probe head which comprises a first housing part 10 adapted for attachment to a position determining apparatus (not shown). Housing part 10 contains a rotary drive mechanism of the present invention which includes a motor 12 to provide rotation of an output shaft 14 about a first axis z. Attached to the shaft 14 is a second housing part 16 which contains a second rotary drive mechanism including a motor 18 to provide rotation of a second shaft 20 about a second axis x orthogonal to the first axis z.

Attached to the second shaft for rotation therewith is a surface sensing device 22 which, in a typical scanning operation, is driven over the surface of a workpiece to enable measurements to be made of points on the workpiece surface.

Power is supplied to the rotary drive mechanisms through electrical connections 24, from a controller 26 which is programmed to control the surface sensing device to move over the surface of a workpiece in a desired series of moves. Transducers within the head send signals indicative of the angular positions of the drive mechanisms about their respective axes back to servo control loops in the controller. These signals together with signals from the measuring devices of the machine on which the head is mounted, enable the relative positions of the surface sensing device and a workpiece surface to be accurately controlled.

As explained above vibrations induced in the machine due to oscillating motions of the surface sensing device and its rotary drive mechanisms are reduced by using an inertia balanced motor in at least one of the rotary drive mechanisms.

Figure 2:
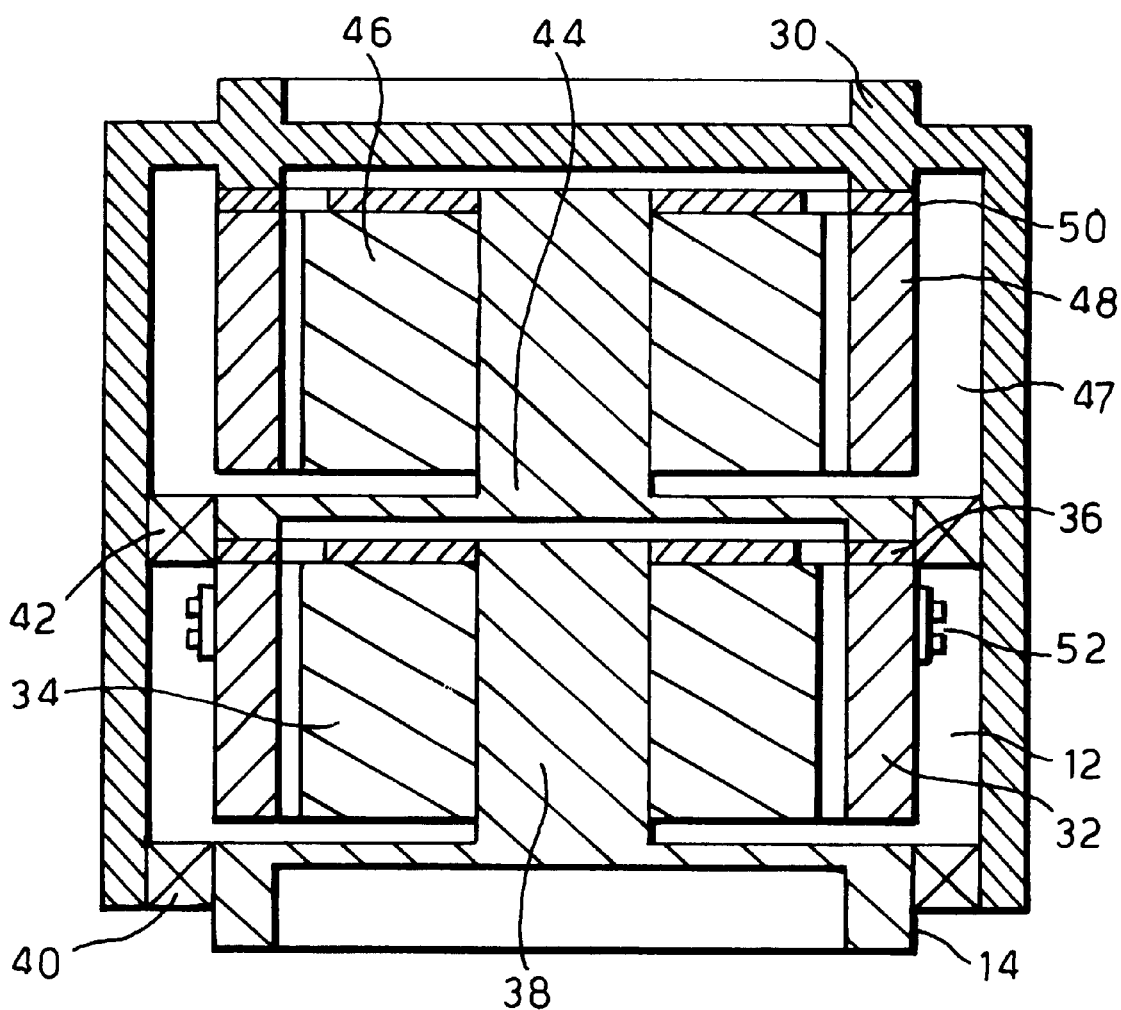
FIG. 2 is a diagrammatic representation in cross-section of a reactionless rotary drive mechanism of the present invention.

Referring now to FIG. 2 details of a rotary drive mechanism incorporating the additional motor of the present invention are illustrated diagrammatically by way of example. It is to be understood however, that the following description can be applied to either one, or both of the rotary drive mechanisms of the articulating head.

The mechanism is contained within a housing which includes a flange 30 to enable the housing to be connected to the quill of a measuring machine, or to the housing of the other rotary drive mechanism.

The mechanism shown consists of a main drive motor 12 having a main drive magnet assembly 32 and a main drive winding assembly 34. Power is supplied to the main drive winding assembly through a brush assembly 36 to drive the main drive rotor 38, which in this example, is connected to the main drive winding assembly. The main drive rotor is connected to the output shaft 14 which is mounted for rotation on a bearing 40.

The main drive magnet assembly which would normally form the stator of the motor, is also mounted on a bearing 42, so that when power is supplied to drive the shaft 38, the reaction in the main drive magnet assembly causes this stator assembly to rotate freely on the bearing 42 with an equal and opposite angular momentum.

It can be seen that the motor 12 behaves as a reactionless rotary drive mechanism as far as any rotary accelerations and decelerations are concerned.

The rotating stator assembly, in this example, is connected through a shaft 44 to a winding assembly 46 of an additional "back-to-earth" (BTE) motor 47, the magnet assembly 48 of which is connected to the housing. A further brush assembly 50 is provided to enable power to be supplied to the BTE winding assembly.

Because both parts of the motor are rotatable, the power connections to the motor parts are brought across from the housing through a slip ring assembly 52.

The additional BTE motor provides a reaction force to counter the rotation of the freely rotating stator. This force increases as the speed of the stator increases. Also the brush assembly 50 can be used to supply power to the BTE motor windings to counter the losses which would otherwise tend to slow the stator down when the main motor is running at constant angular velocity.

Figure 3:
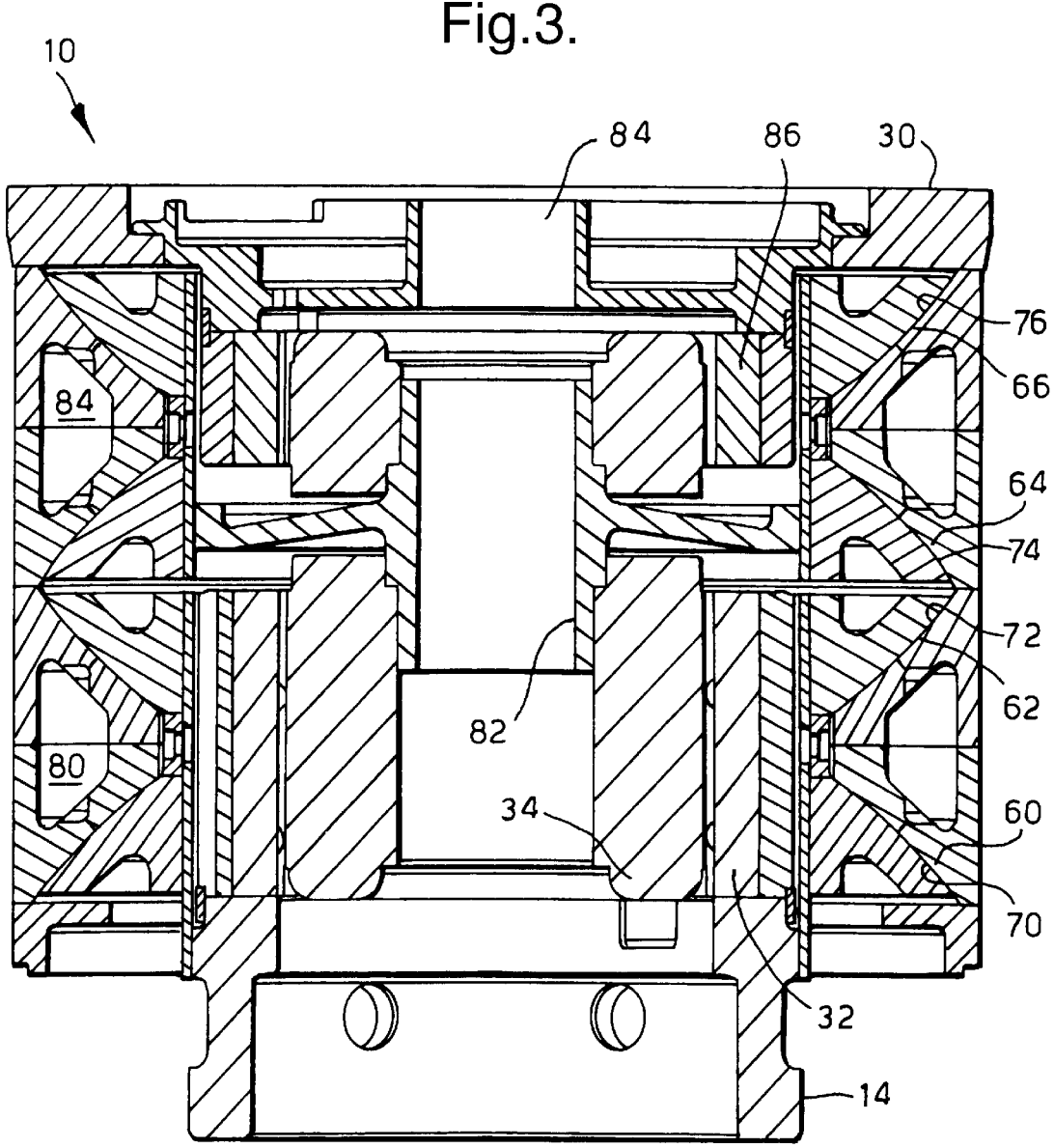
FIG. 3 is a detailed cross-section of one embodiment of a reactionless rotary drive mechanism as incorporated in an articulating head of FIG. 1.

FIG. 3 is a cross-section of a preferred embodiment of the invention in which, where possible, the same reference numerals have been used to indicate the same parts.

In this embodiment the rotary drive mechanism is mounted within the housing part 10 of the articulating head of FIG. 1 so that the flange 30 is to be connected to the machine quill and the output shaft 14 is to be connected to the second part 16.

The housing part 10 provides part-spherical bearing support surfaces 60,62,64 and 66 for supporting the rotating elements of the drive mechanisms.

In this embodiment the main drive magnet assembly 32 of the main drive motor is connected to the output shaft 14, and is supported for rotation on the bearing surfaces 60 and 62 by a pair of oppositely facing part-spherical bearing surface 70 and 72. The surfaces 70 and 72 are shaped to co-operate with the bearing surfaces 60 and 62 to form an air bearing which is supplied with pressurised air through nozzles from a main air duct 80.

The main drive winding assembly 34 of the main drive motor is connected by means of a shaft 82 to the winding assembly 84 of a BTE motor, the magnet assembly 86 of which is connected to the housing 10.

A pair of oppositely facing bearing surfaces 74 and 76 connected to the shaft 82 support the shaft on the bearing surfaces 64 and 66. Once again the bearing surfaces 74,76 are shaped to co-operate with the bearing surfaces 64,66 to form an air bearing which is supplied with pressurised air from a main duct 84.

The power supply to both the main drive winding assembly and the BTE motor winding assembly is supplied by a brush assembly not shown in this view.

Figure 4:
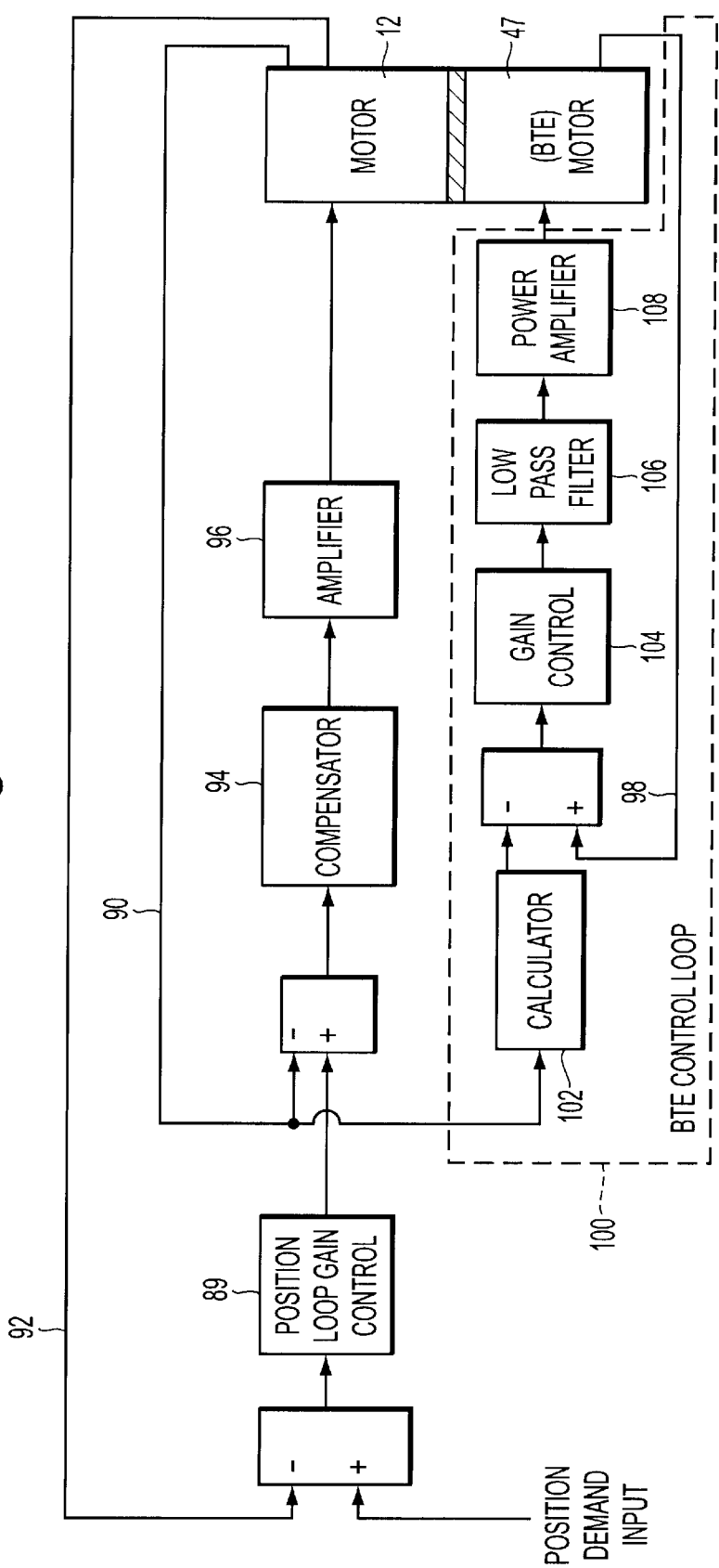
FIG. 4 is a block diagram showing the basic elements of the controller used to control the reaction drive.

The controller 26 that implements the control strategy for the reactionless drive system has a structure shown in FIG. 4. The controller performs two tasks, a) it controls the position of the main drive rotor against an input demand, and b) it controls the speed of the free-spinning stator so as to maintain the reactionless nature of the entire drive system.

Position control of the main drive rotor 38 is achieved using an inner drive rotor speed feedback loop 90 and an outer drive rotor position feedback loop 92. Control action is applied to the inner speed loop in the form of a Proportional-Integral-Derivative (PID) compensator 94, the output of which is passed via an amplifier 96 to the main drive motor 12. Proportional control action is also applied to the positional error in the outer loop, which includes a position loop gain control 89.

Control of the BTE motor is achieved using feedback of the free-spinning stator speed 98. The BTE control loop 100 (the elements of which are enclosed within the dotted boundary), produces a correction signal that generates a torque in the BTE motor so as to eliminate the effects of external torques acting on the main drive rotor. In the presence of an external torque, the speed of the free-spinning stator would diverge from its desired speed. The BTE control loop will generate a torque in the BTE motor to correct the speed difference. The main elements of the BTE control loop are a calculator 102, which calculates the desired speed of the free-spinning stator, a gain control 104, a second order low pass filter 106 and a power amplifier 108.

The torque produced by the BTE motor is proportional to the difference between the measured speed of the free-spinning stator and its desired speed as described in the following equation;

$$T_{rm} = K_{BTE}(\text{Desired Free-Spinning Stator Speed} - \text{Measured Free-Spinning Stator Speed})$$

Where $T_{rm}$ denotes the torque produced by the BTE motor $K_{BTE}$ denotes the BTE loop gain The desired speed of the free-spinning stator is calculated using the following equation;

Desired Free – Spinning Stator Speed =

$$\left(\frac{\text{Total Inertia on Drive Rotor}}{\text{Total Inertia on Free} - \text{Spinning Stator}}\right) \text{Drive Rotor Speed}$$

In a probe system, the total inertia on the drive motor is likely to change both statically (when a probe or stylus is changed) and dynamically (changes in angle of the probe with respect to an orthogonal rotary axis). The inertia of the free-spinning stator is unlikely to change. The desired free-spinning stator speed is calculated in real-time using prior knowledge of inertia values of the physical system. The static inertia values are represented in the form of a look-up table corresponding to the probe and stylus type. The dynamics changes to the drive rotor inertia are implemented in the form of an equation that takes into account the dynamically changing angle of the probe.

The BTE control loop is made to have a low bandwidth through the second order low pass filter 106 since fast control action is not essential for controlling the speed of the free-spinning stator. It is desirable to have a low bandwidth BTE control for two reasons; firstly, during acceleration or deceleration of the main drive motor, the reaction torque generated in the free-spinning stator should not be acted upon by the BTE control loop. BTE control should only be applied to slowly changing speed variations in the free-spinning stator. Secondly, the BTE control loop is a slave to the main drive motor control loop that has a high bandwidth. Should both the control loops have the same bandwidth, there is a chance of undesired interactions between the two loops.

What is claimed is:

1. A reactionless rotary drive mechanism for a positioning device, said mechanism comprising:

a housing;

a first motor for positioning an output shaft relative to the housing, said first motor having a first rotor connected to the output shaft, and a first stator which is also mounted for rotation relative to the housing on a stator shaft whereby rotary acceleration torques applied to the output shaft by the first motor are counterbalanced by equal and opposite accelerations of the stator shaft;

a second motor having a second rotor connected to the stator shaft of the first motor, and a second stator connected to the housing;

means for supplying power to each motor; and control means for controlling the power supplied to the second motor to counter external torques applied to the output shaft and to maintain the desired speed of rotation of the first stator shaft.

2. A reactionless rotary drive mechanism according to claim 1 wherein the control means further controls the position of the output shaft in accordance with the power supplied to the first motor.

3. A reactionless rotary drive mechanism according to claim 1 wherein the controller controls both the position and the speed of rotation of the output shaft.

4. A reactionless rotary drive mechanism according to claim 1 wherein the desired speed of rotation of the first stator shaft is calculated from the speed of rotation of the output shaft and the ratio of the inertias on the output shaft and the stator shaft.

5. A reactionless rotary drive mechanism according to claim 1 wherein the torque produced by the second motor is proportional to the difference between the measured speed of the first stator shaft and its desired speed.

6. A reactionless rotary drive mechanism according to claim 1 and wherein the control loop for controlling the speed of rotation of the first stator shaft includes a low pass filter.

7. A reactionless rotary drive mechanism according to any claim 1 wherein the positioning device is an articulating probe head.

\* \* \* \* \*

UNITED STATES PATENT AND TRADEMARK OFFICE
CERTIFICATE OF CORRECTION

PATENT NO. : 6,633,143 B2  Page 1 of 1
DATED : October 14, 2003
INVENTOR(S) : Nicholas J. Weston et al.

It is certified that error appears in the above-identified patent and that said Letters Patent is hereby corrected as shown below:

<u>Title page,</u>
Item [75], Inventor, please correct the inventors as follows:
-- [75]  Inventors:  Nicholas J. Weston, Edinburgh (GB);
   Kenneth C-H Nai, Edinburgh (GB);
   Geoff McFarland, Dursley (GB);
   David R. McMurtry, Dursley (GB) --
Please add the data as follows:
-- [30]   Foreign Application Priority Data
   Feb. 3, 2000    [GB]   United Kingdom ................. 0002375.4 --

Signed and Sealed this

Tenth Day of February, 2004

JON W. DUDAS
*Acting Director of the United States Patent and Trademark Office*